US011643167B2

(12) United States Patent
Hoelle

(10) Patent No.: US 11,643,167 B2
(45) Date of Patent: May 9, 2023

(54) MULTI-SPROCKET ARRANGEMENT

(71) Applicant: SRAM DEUTSCHLAND GmbH, Schweinfurt (DE)

(72) Inventor: Philipp Hoelle, Schweinfurt (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 266 days.

(21) Appl. No.: 16/985,545

(22) Filed: Aug. 5, 2020

(65) Prior Publication Data
US 2021/0039747 A1  Feb. 11, 2021

(30) Foreign Application Priority Data
Aug. 5, 2019 (DE) ..................... 20 2019 003 258.4

(51) Int. Cl.
*B62M 9/10* (2006.01)
(52) U.S. Cl.
CPC ..................................... *B62M 9/10* (2013.01)
(58) Field of Classification Search
CPC ....................................................... B62M 9/10
USPC ......................................................... 474/160
See application file for complete search history.

(56) References Cited

U.S. PATENT DOCUMENTS

| 5,437,582 | A | * | 8/1995 | Romano | B62M 9/10 474/160 |
| 5,503,598 | A | * | 4/1996 | Neuer | B62M 9/10 474/160 |
| 6,340,338 | B1 | | 1/2002 | Kamada | |
| 2013/0072334 | A1 | * | 3/2013 | Braedt | B62M 9/10 474/156 |

FOREIGN PATENT DOCUMENTS

| CN | 107813900 A | * | 3/2018 | ............. B62M 9/10 |
| DE | 4330989 | | 3/1995 | |
| DE | 102011013695 | | 9/2012 | |
| EP | 0510361 | | 10/1992 | |
| EP | 1522490 A2 | * | 4/2005 | ............. B62M 9/10 |

* cited by examiner

*Primary Examiner* — Gene O Crawford
*Assistant Examiner* — Emily R Kincaid

(57) ABSTRACT

A multi-sprocket arrangement for a bicycle includes a larger sprocket having a passage recess on an outer link plate passage tooth on an outboard side of the larger sprocket facing a smaller sprocket. The recess is on a side of the larger sprocket facing the smaller sprocket. The passage recess extends from a radially outer tooth tip of the outer link plate passage tooth to a non-load tooth flank of the outer link plate passage tooth or a tooth base directly adjacent to the outer link plate passage tooth such that during a gear shifting of a chain from a larger sprocket to a directly adjacent smaller sprocket, the chain passes the outer link plate passage tooth on the outboard side of the sprocket.

4 Claims, 5 Drawing Sheets

MULTI-SPROCKET ARRANGEMENT

BACKGROUND OF THE INVENTION

Derailleur system components on modern bicycles are the product of development over many years. This relates in particular to the multi-sprocket systems on the rear wheel, where up to 12 sprockets are arranged. For the purpose of shifting gears, a gearshift mechanism shifts the chain between the sprockets. The chain is disengaged from a starting sprocket and brought into engagement on a target sprocket. This shifting operation is intended to be performed in a particularly smooth and quiet manner, for this reason various shift aids are made use of on the sprockets.

For performing a shift to a larger sprocket, gearshift channels, in particular, are provided on the target sprocket, which provide space for the chain in order for the chain to be able to move as far as possible onto the larger sprocket in a direction parallel to the axis of rotation of the sprockets. Without the provided gearshift channels, the chain cannot be moved sufficiently far enough onto the larger sprocket in the inboard direction in order to come into engagement with the teeth on the larger sprocket. Therefore, with the determination of the position of the gearshift channels, it is also determined when the chain is intended to come out of engagement with the teeth on the starting sprocket. If the position is advantageously selected, the operations of disengagement from the smaller starting sprocket and engagement onto the larger target sprocket flow smoothly into one another, which achieves the object of a smooth and quiet shifting process.

For shifting to a smaller target sprocket in the outboard direction, gearshift channels on the target sprocket are not necessary because the chain, radially outside of the teeth on the smaller target sprocket, finds sufficient space at the radius level of the larger starting sprocket. The chain can move there until the gearshift mechanism moves the chain in the outboard direction. In this case, although the situation may arise where the chain initially rides up on the tooth tips on the starting sprocket when said chain is brought out of engagement, the subsequent engagement on the smaller target sprocket is then still possible after a distance of greater or lesser length without engagement.

DE 4330989 has proposed shifting means which are intended to avoid riding-up of the chain. Bevels make it possible for a chain link with inner link plates to be able to laterally pass the tooth on the starting sprocket. This structural approach was developed further in U.S. Pat. No. 6,340,338.

Recesses that start from the tooth tip but do not extend to the load flank of the tooth are already known from DE 10 2011 013 695. The shape and size of the recess is predetermined by the profile of the chain, which shifts from the adjacent smaller sprocket to the sprocket under consideration and by the angular orientation of the starting sprocket and the target sprocket relative to one another.

In contrast to the recess according to this disclosure, which is used during shifting of the chain from the sprocket under consideration to the adjacent smaller sprocket, the recess in DE 10 2011 013 695 is used to form a gearshift channel for shifting of the chain to the sprocket under consideration from the adjacent smaller sprocket, wherein the shifting chain rides up on the sprocket teeth. Such a riding-up is intended to be directly prevented with a gearshift channel which contains the recess according to the invention. As a result of the boundary conditions in the design of the sprockets in DE 10 2011 013 695, the recess must also extend over several teeth.

A particularly advantageous, further developed design of the gearshift channel arises if elements for forming said gearshift channel are arranged on four teeth which follow directly after one another. Said gearshift channel elements interact with chain links which follow directly on the chain, namely with an inner chain link, an outer chain link, a further inner chain link and a second outer chain link, so that the chain disengages from the larger starting sprocket without riding up on the tooth tips.

During the formation of outboard gearshift channels, particular requirements exist in the case of multi-sprocket arrangements with small tooth-number differences between the adjacent sprockets, as shown for example in EP 0 510 361. The tip circle radius of the tooth tips on the smaller target sprocket, with a tooth-number difference of one tooth, is then larger than the root circle of the tooth interspace on the larger starting sprocket. That means that, during a shifting operation, the disengagement operation has not yet concluded, and the engagement has already begun. Both operations proceed simultaneously relative to one another, at least over some of the time period for the shifting operation.

A small tooth-number difference between adjacent sprockets furthermore has the effect that only a few chain links are involved during the shifting operation. These are the chain links engaging on the larger sprocket, the chain links running from the larger to the smaller sprocket and the chain links engaging on the smaller sprocket, which form an S-shape when viewed radially from the outside. In order to arrange the chain in the S-shape, it is necessary to make use of the play between the chain links, the play naturally also being smaller when fewer chain links are involved.

With an increase in the number of sprockets in a multi-sprocket arrangement, the axial thickness of the sprockets and the spacing between adjacent sprockets are reduced overall. The axial spacing between the sprockets is just large enough that it is possible for the sequence of the inner and outer link plates lined up in the chain to only just dip in between the sprockets in the radial direction. Chain pins, which project with their ends beyond the outer link plates, are avoided because of these conditions. The consequence of this is that there is the immediate risk of unintended contact between chain links and sprocket teeth and thus of noise as soon as the chain is displaced in the axial direction.

SUMMARY

One object of the present disclosure is to further improve outboard shifting between multiple sprockets, while maintaining good wear and a cost-effective design. In an embodiment, this object may be achieved by providing a passage recess on the outboard side of a tooth on the starting sprocket that does not extend to the load flank of the tooth. The passage recess can particularly advantageously be employed in the case of a small difference in the numbers of teeth of the adjacent sprockets, wherein further advantages arise if the recess is applied in conjunction with a further three teeth in succession, wherein the resulting tooth sequence can also be arranged highly advantageously on the adjacent smaller sprocket.

In an embodiment a sprocket for a multi-sprocket arrangement comprises a plurality of teeth comprising at least one outer link plate passage tooth having a passage recess on an outboard side of the sprocket facing a smaller sprocket. The passage recess extends from a radially outer tooth tip of the outer link plate passage tooth to a non-load tooth flank of the outer link plate passage tooth or to a tooth base directly adjacent to the outer link plate passage tooth such that during a gear shifting of a chain from a larger sprocket to a directly adjacent smaller sprocket, the chain passes the outer link plate passage tooth on the outboard side of the sprocket.

In an embodiment, the plurality of teeth comprises a sequence of teeth, starting from the outer link plate passage tooth in the direction of rotation, comprising an inner link plate deflecting tooth, an outer link plate engagement tooth and an inner link plate spacer tooth.

In an embodiment a multi-sprocket arrangement comprises a smaller sprocket and a larger sprocket comprising a plurality of teeth comprising at least an outer link plate passage tooth having a recess on an outboard side of the sprocket facing the smaller sprocket. The passage recess extends from a radially outer tooth tip of the outer link pate passage tooth to a non-load tooth flank of the outer link plate passage tooth to a tooth base directly adjacent to the outer link plate passage tooth such that during a gear shifting of the chain from the larger sprocket to the directly adjacent smaller sprocket, the chain passes the outer link plate passage tooth on the outboard side of the sprocket. The smaller sprocket has one tooth fewer than the larger sprocket.

In an embodiment the plurality of teeth of the larger sprocket comprises a sequence of teeth, starting from the outer link plate passage tooth in the direction of rotation, comprising an inner link plate deflecting tooth, an outer link plate engagement tooth and an inner link plate spacer tooth.

In an embodiment starting from the outer link plate passage tooth on the larger sprocket counter to the direction of rotation, the plurality of teeth of the smaller sprocket comprises an outer link plate passage tooth that directly follows the outer link plate passage tooth on the larger sprocket.

In an embodiment the plurality of teeth of the smaller sprocket comprises a sequence of teeth starting from the outer link plate passage tooth of the smaller sprocket in the direction of rotation, comprising an inner link plate deflecting tooth, an outer link plate engagement tooth and an inner link plate spacer tooth.

The foregoing paragraphs have been provided by way of general introduction and are not intended to limit the scope of the claims presented below. The various embodiments, together with further advantages, will be best understood by reference to the following detailed description takin in conjunction with the accompanying drawings.

BRIEF DESCRIPTION OF THE DRAWINGS

FIG. 6 is a side view of the sprocket of FIG. 5, viewed from the side of the next larger sprocket;

Other aspects and advantages of the embodiments disclosed herein will become apparent upon consideration of the following detailed description, wherein similar or identical structures have similar or identical reference numerals.

DETAILED DESCRIPTION

The object of the present disclosure is to further improve outboard shifting between multiple sprockets, while maintaining good wear and a cost-effective product. In an embodiment, this object may be achieved by providing a passage recess on the outboard side of a tooth on the starting sprocket that does not extend to the load flank of the tooth.

Figure 1:
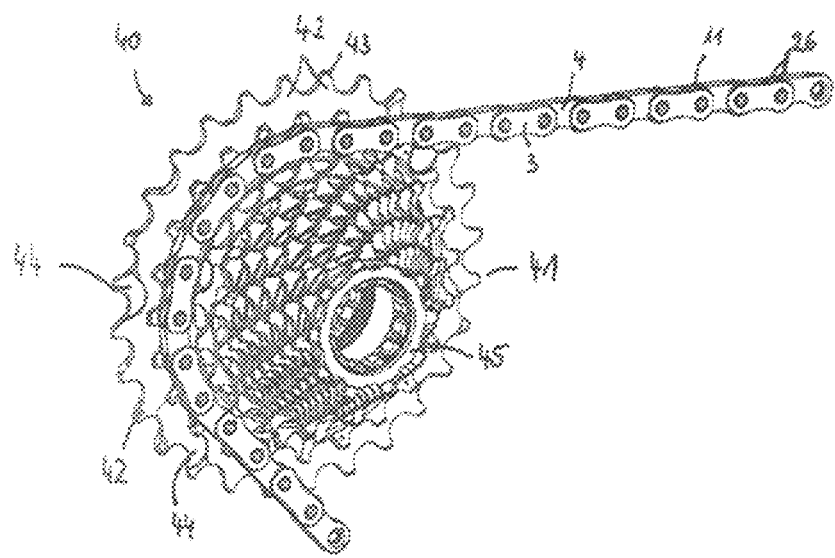
FIG. 1 is a perspective view of a multi-sprocket arrangement in accordance with an embodiment.
Figure 2:
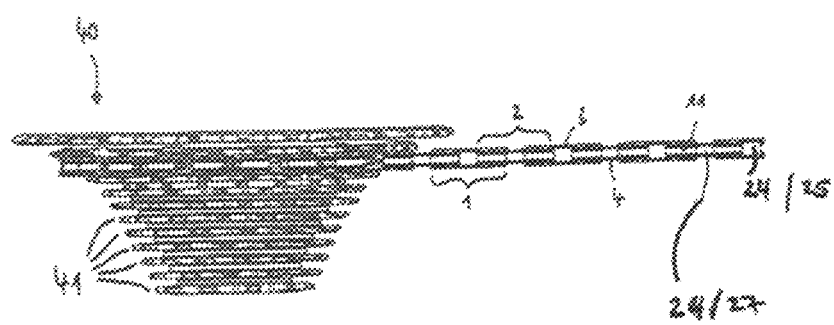
FIG. 2 is top view of the multi-sprocket arrangement of FIG. 1 with a chain engaged with a sprocket of the multi-sprocket arrangement.
Figure 3:
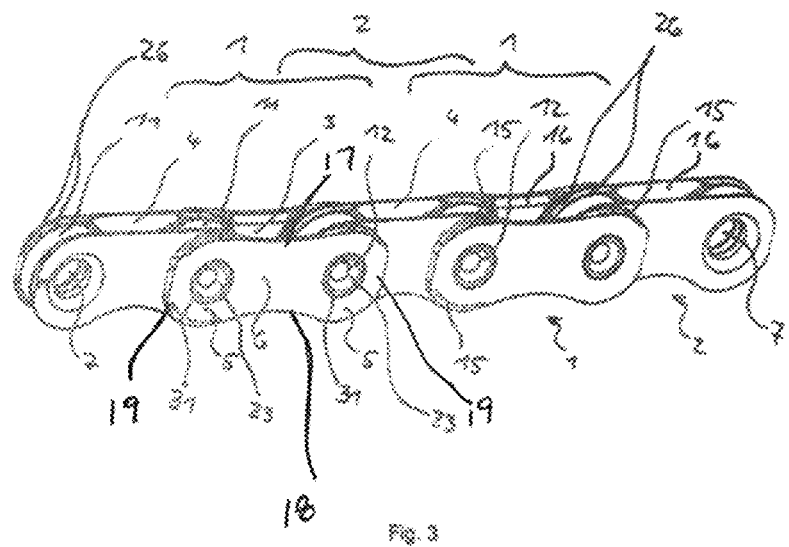
FIG. 3 is a perspective view of a portion of the chain of FIG. 2.
Figure 4:
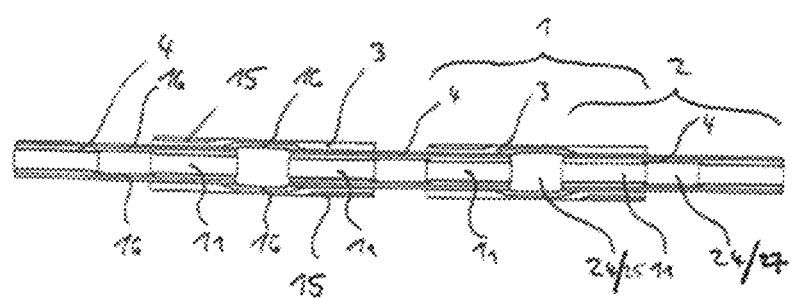
FIG. 4 is a top view of the portion of the chain of FIG. 2 in a direction parallel to the plane of extension of the chain link plates.
Figure 5:
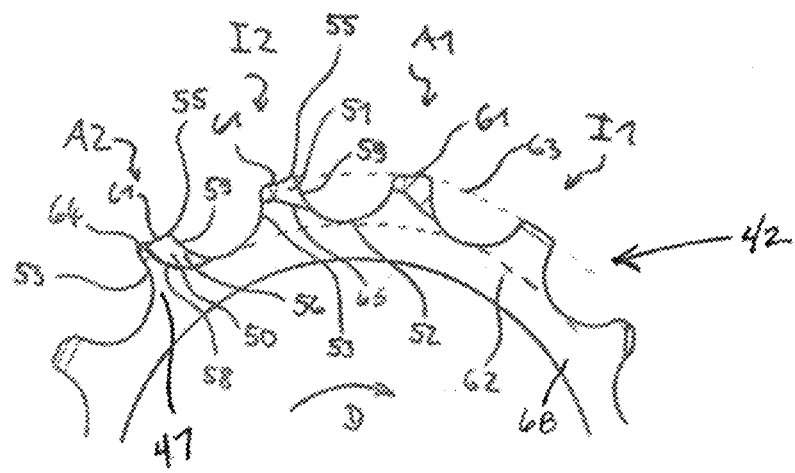
FIG. 5 is a side view of a sprocket of the multi-sprocket arrangement of FIG. 1, viewed from the side of the next smaller sprocket.
Figure 8:
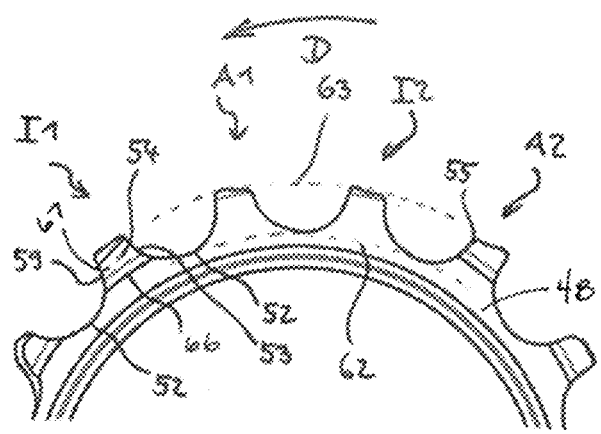
FIG. 8 is a perspective view of an outboard side of the larger sprocket of FIG. 5, viewed obliquely counter to the direction of rotation of the sprocket.
Figure 7:
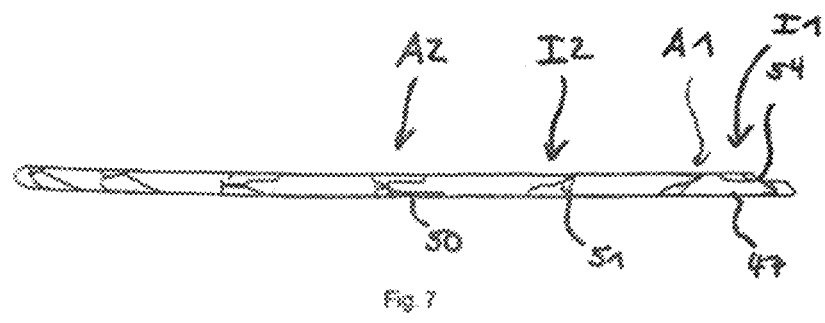
FIG. 7 is a top view of the sprocket of FIG. 5, viewed radially from the outside.
Figure 8:
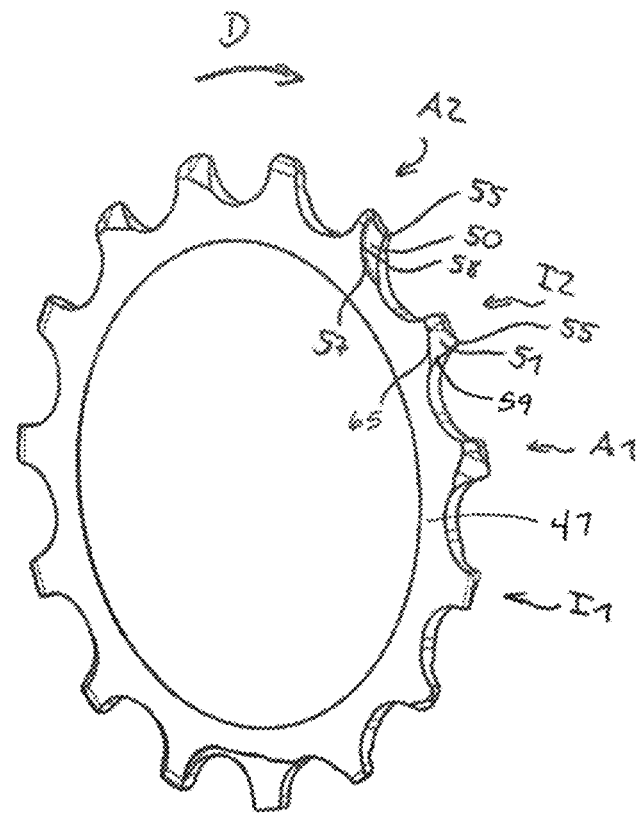

A chain according to FIGS. 3 and 4 in engagement on a set of rear sprockets is shown in FIG. 1 in a perspective view and in FIG. 2 in a top view. The illustrations show only a part of a bicycle drive train, which typically includes a closed chain which passes through a gearshift mechanism with two chain-guiding rollers and engages into a front chain wheel arrangement. The front chain wheel arrangement typically comprises one, two or three chain wheels. With a large number of rear sprockets, one or two front chain wheels are sufficient.

Narrow chains are of importance in particular for multi-sprocket arrangements 40 with an increased number of eleven, twelve or more sprockets 41. On account of the small installation space in the axial direction, the sprockets 41 have to be positioned with very small spacings between each other. The sprocket arrangement 40 shown comprises exactly twelve sprockets 41, which are positioned with prescribed spacings to one another.

The chain shown engages into the teeth 42 of a third-largest sprocket 41 of the multi-sprocket arrangement 40. The chain must be dimensioned to be so narrow that it fits into the free spaces between the sprockets 41 without colliding with the next smaller or next larger sprocket. During the shifting from one sprocket to the next, deflecting chamfers 15 and catching chamfers 16 on the outer and inner faces of the link plates interact with the chamfers 43 of the teeth 42 of the sprockets 41. The sprockets 41 have shifting features 44 which facilitate the shifting.

FIGS. 3 and 4 show how a roller chain for bicycles is constructed from alternately arranged outer chain links 1 and inner chain links 2. A chain link 1, 2 has a respective pair of inner link plates 4 or a pair of outer link plates 3 as the main component. Each of the inner and outer link plates 4, 3 have two end regions 5 with a round outer contour 19, which are connected by a connecting region 6 with concave outer contours 17, 18. The link plates 4,3 form a generally hourglass shape. In the end regions 5, holes 7 are provided concentrically with respect to the round outer contour 19 of the end regions 5.

On the mutually facing sides of the inner link plates of the inner link plate pair, collars (not illustrated) are present. A chain roller 11 is in each case arranged in a rotatable manner on a pair of collars which are arranged in a mirror-inverted manner relative to one another.

A link plate interspace 24 is between each opposed faces of the link plates 3, 4 of the link plate pairs, as shown in FIGS. 2 and 4. The alternately arranged inner chain link 2 and outer chain link 1 are connected to one another in a rotatable manner at the chain joints 23 by chain pins 12. The chain pins 12 are pressed into the holes 7 in the outer link plates 3, whereas play exists between each of the holes 7 in the inner link plates 4 and the chain pins 12 in order to produce the rotatability between the chain links 1, 2 about the chain pins 12. The play also makes it possible for the chain links to turn relative to one another, as a result of which the link plates of the chain links then no longer lie in a plane or are no longer parallel to one another.

Looking to FIGS. 5-9, a plurality of teeth 42 on the sprocket are designed such that outboard shifting, i.e. shifting from a larger sprocket to an adjacent smaller sprocket, is further improved. This improvement is accomplished by including particular features on a plurality of teeth arranged radially on an outer periphery of the sprockets 41. These features are specially formed for a frictionless engagement into the link plate interspaces 24 of the chain and for the shifting of the chain during gear shifting. The structural connection of the plurality of teeth 42 to a support structure or body 68 radially inward from the plurality of teeth is known in the art.

For example, the plurality of teeth may be arranged on a ring, which extends radially inward to an internal driver. In other embodiments, the ring may be arranged on arms of a "spider" or is connected in one piece with rings of adjacent sprockets.

The plurality of teeth 42 includes an outer link plate passage tooth A2. On the outboard side 47 of the outer link plate passage tooth A2, there is a passage recess 50 which provides space for an outer link plate 3 of the chain. The passage recess 50 allows no contact between the tooth A2 and the chain or contact is made only to such an extent that the chain is not deflected too far in the direction of the next smaller sprocket 45. If the chain is deflected too far, problems may arise during the subsequent engagement of the chain on the next smaller sprocket 45. This problem generally exists but is more apparent in the case of adjacent sprockets with a small difference in the number of teeth, especially if the multi-sprocket arrangement includes a large number of sprockets, which is associated with a small axial spacing between the sprockets 41.

The passage recess 50 has a recess bottom 56 and a recess wall 57 along a recess edge 58. The recess edge 58 runs in an arcuate manner from a transition region between the non-load flank or counter flank 59 and the tooth base 52, on the one hand, to the tooth tip 61, on the other, wherein the tooth tip 61 may have a tooth tip chamfer 64. It would also be possible for the passage recess 50 to extend from the radially outer tooth tip 61 of the tooth A2 to the non-load flank 59 or to the tooth base 52, which is directly adjacent to the non-load flank 59 on the outer link plate passage tooth A2, without adversely affecting the function of the passage recess 50.

The recess bottom 56 is flat and parallel to the outboard side 47 of the sprocket. The recess wall 57 extends along the arcuate-shaped recess edge 58 and is oriented perpendicular to the recess bottom 56. The arcuate shape of the recess edge 58 corresponds to the manufacturing method of the multi-sprocket arrangement 40, the material-removing method of milling, wherein particular conditions can be met as a result of the arrangement of the passage recess at a poorly accessible point on the inboard side behind a tooth on the adjacent smaller sprocket 45.

The poor accessibility results from the position of the adjacent teeth on the next smaller sprocket 45 and from the smaller diameter difference between the adjacent sprockets 45, 46 with a difference of only one tooth. The passage recess 50 can be produced by a milling cutter.

In the case of stamped individual sprockets made of a sheet-metal material, the passage recess 50 could also be designed as a bevel, which starts from a tooth corner 55, has its greatest depth at the corner 55 and extends, following the profile of the chain, to the recess edge 58 so as to run out at the edge.

In the direction of rotation D of the sprocket 41, an inner link plate deflecting tooth I2 is directly adjacent to the outer link plate passage tooth A2. The inner link plate deflecting tooth I2 includes a deflecting bevel 51 on the outboard side of the tooth. The deflecting bevel 51 causes the chain, which is displaced in an axial direction towards the outboard direction by a chain guide of a gearshift mechanism, to pass the tooth I2 on the outboard side 47 with an inner link 2, and the tooth I2 does not engage into the inner link plate interspace 27 occurs.

There may be further bevels and recesses on the inboard side of the inner link plate deflecting tooth I2, but they have no significance in relation to the outboard shifting. Of course, no further bevels and recesses can be arranged on the inboard side, which would disrupt the necessary function of the outboard side deflecting bevel 51.

The deflecting bevel 51 extends from a bevel edge 65 to the tooth corner 55 between the counter flank 59 and the tooth tip 61 and is inclined from the bevel edge 65 to the tooth corner 55, with an increasing distance from a plane through the outboard side 47 of the sprocket 46.

Starting from the inner link plate deflecting tooth I2, there follows, as next but one tooth 42, an inner link plate spacer tooth I1 with a spacer recess 54 which makes it possible for an inner chain link 2 to be positioned obliquely to a sufficient extent in relation to the outboard side 47 of the sprocket 41. This oblique positioning is necessary to be able to displace the chain to a sufficient extent in the outboard direction, so that the chain passes the inner link plate deflecting tooth I2 on the outboard side. Otherwise, the chain would ride up on the tooth tips or the teeth 42 would engage into the link plate interspaces 24 without the intended changeover of the chain to the smaller sprocket 45 taking place.

The spacer recess 54 is arranged on the inboard side 48 of the sprocket 46, see FIG. 6. The spacer recess 54 has a recess bottom 67, which is substantially parallel to the outboard side 47 of the sprocket 42, and a recess edge 66. The recess edge 58 extends arcuately concentric with respect to the root circle 62 and with respect to the tooth tip circle 63 of the sprocket 41, between the transition region of the non-load flank 59 and the tooth base, on the one hand, and the transition region of the load flank 53 and the tooth base 52, on the other.

An outer link plate engagement tooth A1 is arranged directly adjacent to both the inner link plate defecting tooth I2 and to the inner link plate spacer tooth I1. The shape of said outer link plate engagement tooth A1 is of no significance to the outboard shifting operation, since it is necessary merely to ensure that the chain is able to be displaced on said tooth to a sufficient extent in the outboard direction. This is already the case if the link plate interspace between the outer link plates, which is larger than the axial tooth thickness, is utilized for the axial displacement.

In order to support the engagement of the outer link passage tooth A2 into the corresponding outer link plate tooth interspace, the tooth tip could be offset in the axial direction towards the outboard side 47.

The provision of the spacer recess 54 on the inner link plate spacer tooth I1, the deflecting bevel 51 on the inner link plate deflecting tooth I2 and the passage recess 50 on the outer link plate passage tooth A2 corresponds to the possibilities for the chain to turn in a direction perpendicular to the outboard side 47 of the sprocket 41 during the shifting of the chain between the adjacent sprockets 45, 46. Space is provided for all those components of the chain which would otherwise collide with the teeth 42 of the sprocket 41.

Figure 9:
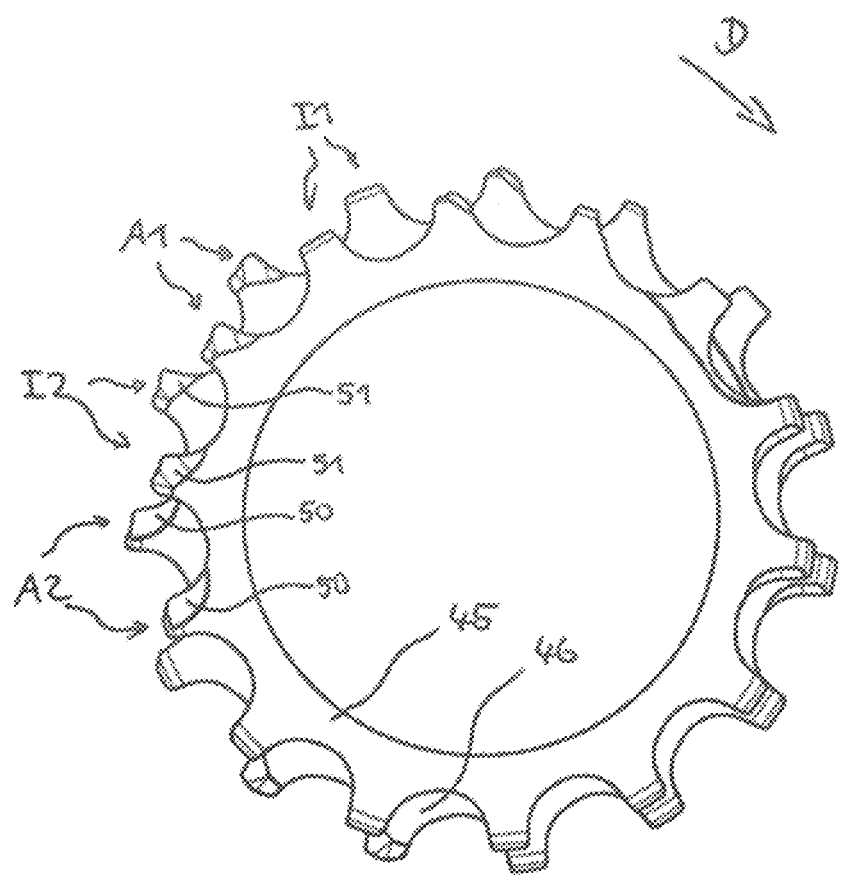
FIG. 9 is a side view of the larger sprocket of FIG. 5 and a smaller sprocket, viewing direction in the direction of the larger sprocket parallel to the axis of rotation of the sprockets.

FIG. 9 shows how, just like on the larger sprocket 46, a similar sequence of special teeth, namely an inner link plate spacer tooth I1, an outer link plate engagement tooth A1, an inner link plate deflecting tooth I2 and an outer link plate passage tooth A2, is arranged on the smaller sprocket 45 which is arranged on the outboard side relative to the larger sprocket 46.

The outer link plate passage tooth A2 on the smaller sprocket is rotationally offset counter-clockwise in relation to the outer link plate passage tooth A2 on the larger sprocket 46, as viewed from outboard direction. This results in the advantage that the chain which engages again on the smaller sprocket 45 provides the possibility of good engagement on the smaller sprocket 45 without additional recesses or bevels on the smaller sprocket 45, which recesses or bevels would be provided specifically for the engagement of the chain.

The passage recess 50 and the deflecting bevel 51 on the smaller sprocket can thus be used for the engagement of the chain which changes to the smaller sprocket 45.

The outer chain link 1, which passes the passage recess 50 on the larger sprocket on the outboard side, is available for the engagement of the inner link plate deflecting tooth I2 on the smaller sprocket. The tooth tip 61 of the inner link plate deflecting tooth I2 on the smaller sprocket 45 already moves into the outer link plate interspace 25.

An inner link plate chain link 2 on the smaller sprocket 45 can also engage on the outer link plate passage tooth A2 after an outer chain link 1 has passed the outer link plate passage tooth A2 on the larger sprocket 46 on the outboard side.

During the shifting operation of the chain in the outboard direction from a larger sprocket to a smaller adjacent sprocket, initially an inner link plate spacer tooth engages into an inner chain link and an outer link plate engagement tooth engages into an outer chain link. In this case, the chain links move radially inwards from radially outside after one another, wherein the chain rollers enter the tooth interspaces.

Then an inner chain link passes an inner link plate deflecting tooth, and an outer chain link passes the outer link plate passage tooth, on the outboard side of the sprocket. The tooth sequence starting from the outer link plate passage tooth in the direction of rotation of the sprocket, comprises an inner link plate deflecting tooth, an outer link plate engagement tooth and an inner link plate spacer tooth.

The illustrations of the embodiment described herein are intended to provide a general understanding of the structure of the embodiment. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to a particular embodiment of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although an embodiment has been illustrated and described herein, it should be appreciated that any subsequent arrangement designed to achieve the same or similar purpose may be substituted for the specific embodiment shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A sprocket for a multi-sprocket arrangement, the sprocket comprising:
   a plurality of teeth, the plurality of teeth comprising at least an outer link plate passage tooth having a passage recess on an outboard side of the sprocket facing a smaller sprocket, the plurality of teeth comprising a sequence of teeth, starting from the outer link plate passage tooth in the direction of rotation, comprising an inner link plate deflecting tooth, an outer link plate engagement tooth and an inner link plate spacer tooth,
   the passage recess extending from a radially outer tooth tip of the outer link plate passage tooth to a non-load tooth flank of the outer link plate passage tooth or a tooth base directly adjacent to the outer link plate passage tooth such that during a gear shifting of a chain from a larger sprocket to a directly adjacent smaller sprocket, the chain passes the outer link plate passage tooth on the outboard side of the sprocket.

2. A multi-sprocket arrangement comprising:
a smaller sprocket having a plurality of teeth; and
a larger sprocket comprising a plurality of teeth comprising at least an outer link plate passage tooth having a passage recess on an outboard side of the outer link plate passage tooth facing the smaller sprocket, the plurality of teeth of the larger sprocket comprising a sequence of teeth, starting from the outer link plate passage tooth in the direction of rotation, comprising an inner link plate deflecting tooth, an outer link plate engagement tooth and an inner link plate spacer tooth,
the passage recess extending from a radially outer tooth tip of the outer link plate passage tooth to a non-load tooth flank of the outer link plate passage tooth or a tooth base directly adjacent to the outer link plate passage tooth such that during a gear shifting of the chain from the larger sprocket to the directly adjacent smaller sprocket, the chain passes the outer link plate passage tooth on the outboard side of the sprocket, the smaller sprocket having one tooth fewer than the larger sprocket.

3. The multi-sprocket arrangement according to claim 2, wherein starting from the outer link plate passage tooth on the larger sprocket counter to the direction of rotation, the plurality of teeth of the smaller sprocket comprises an outer link plate passage tooth that directly follows the outer link plate passage tooth on the larger sprocket.

4. The multi-sprocket arrangement according to claim 3, wherein the plurality teeth of the smaller sprocket comprises a sequence of teeth starting from the outer link plate passage tooth of the smaller sprocket in the direction of rotation, comprising an inner link plate deflecting tooth, an outer link plate engagement tooth and an inner link plate spacer tooth.

* * * * *